US012800432B2

(12) United States Patent
Yu et al.

(10) Patent No.: US 12,800,432 B2
(45) Date of Patent: Nov. 17, 2026

(54) SIX-DEGREE-OF-FREEDOM VIBRATIONAL EXCITATION FOUNDATION PLATFORM

(71) Applicant: Harbin Institute of Technology, Harbin (CN)

(72) Inventors: Chenglong Yu, Harbin (CN); Bin Li, Harbin (CN); Tianyi Li, Harbin (CN); Xuyang Yu, Harbin (CN); Bo Zhao, Harbin (CN)

(73) Assignee: Harbin Institute of Technology, Harbin (CN)

( * ) Notice: Subject to any disclaimer, the term of this patent is extended or adjusted under 35 U.S.C. 154(b) by 273 days.

(21) Appl. No.: 18/670,629

(22) Filed: May 21, 2024

(65) Prior Publication Data

US 2024/0418598 A1 Dec. 19, 2024

(30) Foreign Application Priority Data

Jun. 13, 2023 (CN) ........................ 202310692905.9

(51) Int. Cl.
*G01M 7/06* (2006.01)
*G01M 7/00* (2006.01)
(Continued)

(52) U.S. Cl.
CPC ................ *G01M 7/06* (2013.01); *G01M 7/00* (2013.01); *G01M 7/02* (2013.01); *G01M 7/04* (2013.01)

(58) Field of Classification Search
CPC ............ G01M 7/06; G01M 7/00; G01M 7/02; G01M 7/04; G01M 7/027
(Continued)

(56) References Cited

U.S. PATENT DOCUMENTS

| | | | | |
|---|---|---|---|---|
| 4,645,017 A * | 2/1987 | Bodine | E02D 7/18 173/162.1 |
| 4,735,089 A * | 4/1988 | Baker | G01M 7/06 73/665 |

(Continued)

FOREIGN PATENT DOCUMENTS

| | | | |
|---|---|---|---|
| CA | 2155256 A1 * | 2/1996 | F16F 7/104 |
| CN | 103075615 B * | 1/2014 | |

(Continued)

OTHER PUBLICATIONS

Bernstein, Dennis S., A Six-Degree-of-Freedom Shaker Table, Active Isolator, and Gimbaled Stage for Research in Precision Motion Control and Target Tracking, Department of Aerospace Engineering University of Michigan, 2002, p. 14 (Year: 2002).*

(Continued)

*Primary Examiner* — Stephanie E Bloss
*Assistant Examiner* — Kevin C Butler
(74) *Attorney, Agent, or Firm* — Fideli Law PLLC; Qiang Li

(57) ABSTRACT

Provided is a six-degree-of-freedom vibrational excitation foundation platform, which solves the problem of the existing vibrational excitation foundation equipment that a vibrational excitation frequency band is narrow due to low natural frequency of the equipment. The six-degree-of-freedom vibrational excitation foundation platform includes a marble platform support frame, which is fixedly installed on a concrete floor through a backing plate; and a marble platform, which serves as an excited device and is located in a middle of the support frame, and four sides of the marble platform support frame are connected to the motors fixedly connected to the support frame through connecting plates. The parallel connection of motor outputs solves the problem of insufficient excitation, and natural frequency of each part of the platform is increased by optimizing the marble (Continued)

platform and the support frame, such that the frequencies are controllable within the vibrational excitation frequency band.

4 Claims, 2 Drawing Sheets

(51) Int. Cl.
*G01M 7/02* (2006.01)
*G01M 7/04* (2006.01)

(58) Field of Classification Search
USPC .............................................................. 73/663
See application file for complete search history.

(56) References Cited

U.S. PATENT DOCUMENTS

| | | | | | |
|---|---|---|---|---|---|
| 4,973,145 | A * | 11/1990 | Kirkwood | F16C 11/06 359/223.1 |
| 5,726,361 | A * | 3/1998 | Ogawa | C25D 5/20 73/664 |
| 6,220,100 | B1 * | 4/2001 | Felkins | G01M 7/022 73/663 |
| 9,474,683 | B1 * | 10/2016 | Mortimer | A61H 23/0263 |
| 10,095,248 | B1 * | 10/2018 | Ruffa | G05D 19/02 |
| 2004/0083812 | A1 * | 5/2004 | Ichinose | G01C 19/5719 73/504.12 |
| 2005/0022600 | A1 * | 2/2005 | Hudec | G01M 13/04 73/579 |
| 2006/0279028 | A1 * | 12/2006 | Haregoppa | B29C 65/087 267/137 |
| 2007/0001522 | A1 * | 1/2007 | Nitzsche | F16F 15/04 248/638 |
| 2009/0200880 | A1 * | 8/2009 | Mortimer | B06B 1/10 310/81 |
| 2014/0300113 | A1 * | 10/2014 | Bachmann | F03G 7/08 290/1 R |
| 2021/0119555 | A1 * | 4/2021 | Toshiyoshi | H02N 2/186 |
| 2024/0418598 | A1 * | 12/2024 | Yu | G01M 7/06 |

FOREIGN PATENT DOCUMENTS

| | | | | | |
|---|---|---|---|---|---|
| CN | 103453062 | B | * | 6/2015 | F16F 6/00 |
| CN | 104865034 | B | * | 9/2017 | |
| CN | 107422491 | A | * | 12/2017 | G02B 27/62 |
| CN | 111551328 | B | * | 7/2021 | G01M 7/022 |
| CN | 112880953 | B | * | 4/2022 | G01M 7/06 |
| CN | 114323526 | A | * | 4/2022 | |
| CN | 217797441 | U | * | 11/2022 | |
| CN | 115755943 | A | * | 3/2023 | |
| CN | 109682564 | B | * | 7/2023 | G01M 7/06 |
| CN | 221569876 | U | * | 8/2024 | |
| CN | 119223562 | A | * | 12/2024 | G01M 13/00 |
| CN | 119756748 | A | * | 4/2025 | |
| CN | 121742377 | A | * | 3/2026 | |
| EP | 0848186 | A2 | * | 6/1998 | F16F 15/02 |
| JP | 2003287475 | A | * | 10/2003 | |
| JP | 6277527 | B2 | * | 2/2018 | |
| WO | WO-8704242 | A | * | 7/1987 | G01M 7/00 |
| WO | WO-03091684 | A1 | * | 11/2003 | G01M 7/06 |

OTHER PUBLICATIONS

Schoenwald et al., Cross Laminated Timber Elements with Functional Grading and Localized Ballast to Improve Airborne and Impact Sound Insulation, 10th Convention of the European Acoustics Association, Turin Italy Sep. 11-15, 2023 (Year: 2023).*

Zouari et al., Flexural wave band gaps in metamaterial plates: A numerical and experimental study from infinite to finite models, Journal of Sound and Vibration 435 (2018) 246-263 (Year: 2018).*

* cited by examiner

SIX-DEGREE-OF-FREEDOM VIBRATIONAL EXCITATION FOUNDATION PLATFORM

TECHNICAL FIELD

The present invention belongs to the technical field of vibration testing machine, and particularly relates to a six-degree-of-freedom vibrational excitation foundation platform.

BACKGROUND

Being capable of exciting a specified vibration frequency, a vibrational excitation foundation platform is an effective supporting device to test the vibration isolation effect of a vibration isolation system. A vibration testing machine simulates various environmental conditions that a product may encounter at the manufacturing, assembly, transportation and usage stages, so as to evaluate the product's capability to withstand environmental vibrations. The vibration testing machine is applicable to the research, development, quality control and manufacturing of various industries such as electronics, electromechanics, optoelectronics, automotive and toys.

A vibration platform, also known as a vibration exciter or a vibration generator, is a device that generates mechanical vibrations by using electric, electro-hydraulic, piezoelectric or other principles. An electro-hydraulic platform is applicable to mid-low frequency ranges, an electric platform is applicable to mid-high frequency ranges, and a mechanical platform is applicable to the narrowest frequency range. In addition, comprehensive considerations should be given to magnitude of thrust, quality of waveform and convenience of control.

Through an electric vibrational excitation method, the present invention achieves low-frequency controllability, distortion-free operation, high load capacity, water cooling, excellent anti-bias load performance, and the like, thereby overcoming some defects of the traditional electric vibrational excitation. The vibrational excitation foundation platform in the present invention mainly has the following functions:

1. Frequency modulation: any single frequency within a frequency range can excite vibrations between VC-A to VC-C standards.

2. Frequency sweep: (upper frequency/lower frequency/time range) different vibration standards can be set to sweep back and forth.

3. Full-featured computer control: the computer has such functions as fine control, storage and recording.

SUMMARY

An objective of the present invention is to provide a six-degree-of-freedom vibrational excitation foundation platform to solve the problems mentioned in the background art.

The present invention is implemented by means of the following technical solution: the present invention provides a six-degree-of-freedom vibrational excitation foundation platform, and the platform includes a marble platform and a marble platform support frame; where the marble platform support frame is an assembly that supports the marble platform and withstands reactive force of a motor, and the motor and air springs are installed on the marble platform support frame; the marble platform support frame is fixedly installed on a concrete floor through a backing plate; the marble platform serves as an excitated device and is located in a middle of the support frame, and four sides of the marble platform are connected to the motors fixedly connected to the support frame through connecting plates, Further, the marble platform includes vertical motor connection surfaces, on which the following components are mounted: 2*4 M20 mounting threaded hole arrays of the motor; air spring support surfaces being symmetrically distributed in a total of eight areas; short connecting plate mounting surfaces, on a single side of which is provided with 2*10 M20 mounting threaded holes array that are symmetrically distributed; 14 lightening holes being symmetrically distributed, each with a dimension of ¢76 mm*1200 mm; hoisting holes used for flipping and hoisting each with a dimension of $80 mm*150 mm; speed sensor mounting holes in X\Z\Y directions; and long connecting plate mounting surfaces being symmetrically distributed, on a single side of which is provided with 2*16 M20 mounting threaded hole arrays; and edges of each plane are chamfered to reduce stress concentration, and each edge of the plane is divided into three layers in a vertical direction to reduce local mass while ensuring stiffness, so as to increase natural frequency, and 9*12 M20 mounting threaded hole arrays are symmetrically and evenly distributed on an upper surface of each plane for mounting and fixing the excitated device.

Further, the marble platform is made from uniform marble material with a length, a width and a height of 4 m*3 m*0.6 m, a material density of 3 g/cm$^3$, and a mass of 16.8 t. Under elastic constraint conditions, seventh-order natural frequency of the marble platform is 159.93 Hz.

Further, the marble platform support frame includes a total of two longitudinal beams, on each of which is disposed 2*4 M20 threaded hole arrays everywhere for connecting with other components; a total of 8 motor backup plates in a horizontal direction, on both side and bottom surfaces of which 2*2 M20 threaded holes are formed for connecting the longitudinal beams with triple motors; a total of 22 I-beam legs, on both bottom and top surfaces of which 2*4 M20 threaded hole arrays are disposed for connecting with a bottom surface and other components; a total of 8 reinforcement plates being made of 20 mm thick right-angled steel plate and disposed at four corners of the support frame, on each of which is form 20 M20 threaded holes for reinforcing connection between beams of the frame and the longitudinal beams, such that the stability of the structure is ensured; a total of two beams, on each of which is disposed M20 threaded hole arrays everywhere for connecting with other components; a total of 8 air springs 6 horizontally distributed for bearing weight; the triple motors in the Y/Z/X directions, the three motors generate power, and are spliced together and connected in parallel, with M20 mounting threaded holes formed, motor mounting and adjustment plates are mounted in the holes in a motor output direction, and a total of 36 motors in 12 sets are provided; the motor mounting and adjustment plates for adjusting the mounting posture of the triple motors in the other two directions; limiting devices for ensuring the safety of the marble platform during vibration; air spring brackets for raising the air springs to expand the construction space for maintenance and replacement; short connecting plates, on each of which is disposed 2*16 M20 light holes and 2*15 M20 threaded mounting holes for connecting the marble platform and the triple motors; two structurally similar support legs are welded together for mounting the air springs and the motors in a vertical direction, and a total of 3 support legs are provided; a total of 4 vertical motor backup plates are welded on the legs for mounting the motors in a Z direction;

and long connecting plates, on each of which is disposed 2*16 M20 light holes and 2*15 M20 threaded mounting holes for connecting the marble platform and the triple motors.

Further, an overall dimension of the marble platform support frame is 7 m*5.4 m*1.5 m, and is manufactured by processing and splicing 400 mm*400 mm square steel with a wall thickness of 20 mm as basic materials, and a total mass of the support frame is approximately 17 t. Under fixed constraints, the first-order natural frequency is 150.45 Hz, and first-order natural frequency of the motor backup plates, a component of the support frame, is 515 Hz under fixed constraints, and Mises stress thereof is 0.3 MPa when a motor output reaches the maximum, thereby ensuring that the support frame will undergo neither resonance nor plastic deformation when the marble platform is vibrating.

The present invention has the following beneficial effects:

1. The natural frequencies of the components of the six-degree-of-freedom vibrational excitation foundation platform (marble platform and marble platform support frame) and the natural frequencies of the motor backup plates are all higher than 1.414 times the maximum vibrational excitation frequency. According to the resonance principle, it can be concluded that each part will not be affected by resonance during the vibrational excitation process, resulting in uncontrollable situations.

2. When the marble platform is subjected to the maximum design load (0.286 MPa with a safety factor of 1.2), its Mises stress during simulation is much lower than its compressive strength (212 MPa), indicating that the performance of the marble platform can be guaranteed.

3. When the marble platform support frame is designed, full considerations are given to its strength and stability. With the support of limiting devices, it can guarantee the safety of long-term operation, and a space at the bottom is reserved for maintenance, facilitating the inspection of the components of the vibrational excitation foundation platform and the replacement of damaged components, such that the reliability of the device during long-term use is greatly improved.

4. The six-degree-of-freedom vibrational excitation foundation platform can excite six-degree-of-freedom vibrations (usually only utilizing the vibration functions of three translational degrees of freedom during operation) and achieve decoupling control. In addition, feedback control can ensure that vibration standards of the marble platform can be selected between VC-A and VC-C, such that micro-vibrational excitation functions of single-frequency, sweep-frequency and mixed-frequency can be realized.

DETAILED DESCRIPTION

The technical solutions of embodiments of the present invention will be described below clearly and comprehensively in conjunction with the accompanying drawings of the embodiments of the present invention. Apparently, the embodiments described are merely some embodiments rather than all embodiments of the present invention. All the other embodiments obtained by those of ordinary skill in the art based on the embodiments in the present invention without creative efforts shall fall within the protection scope of the present invention.

Figure 1:
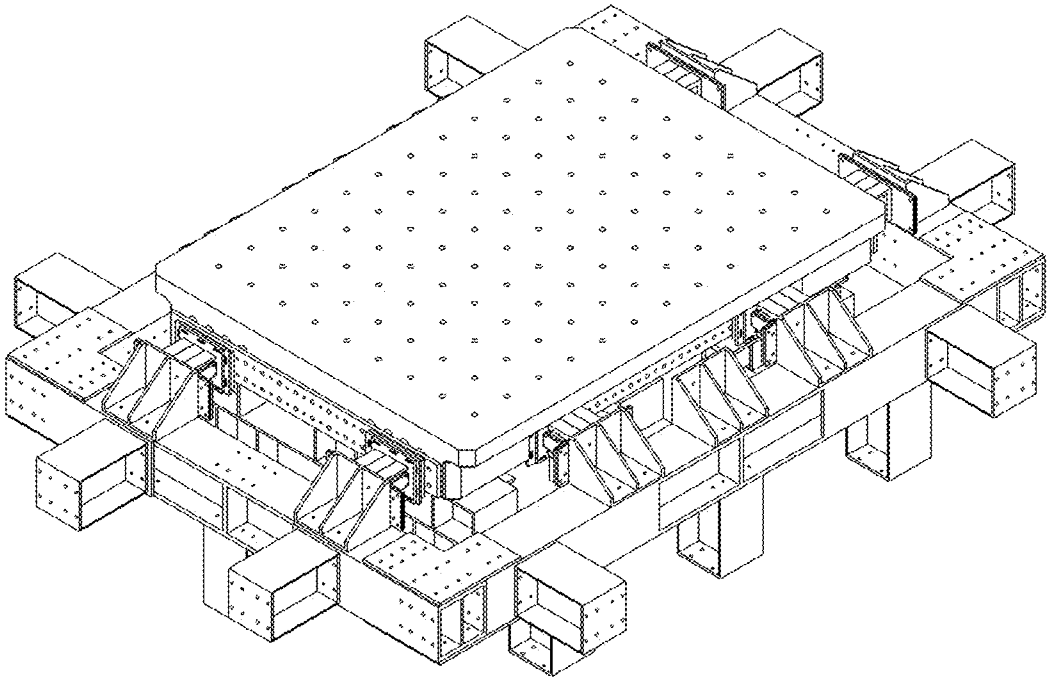
FIG. 1 is a schematic diagram of a six-degree-of-freedom vibrational excitation foundation platform.
Figure 2:
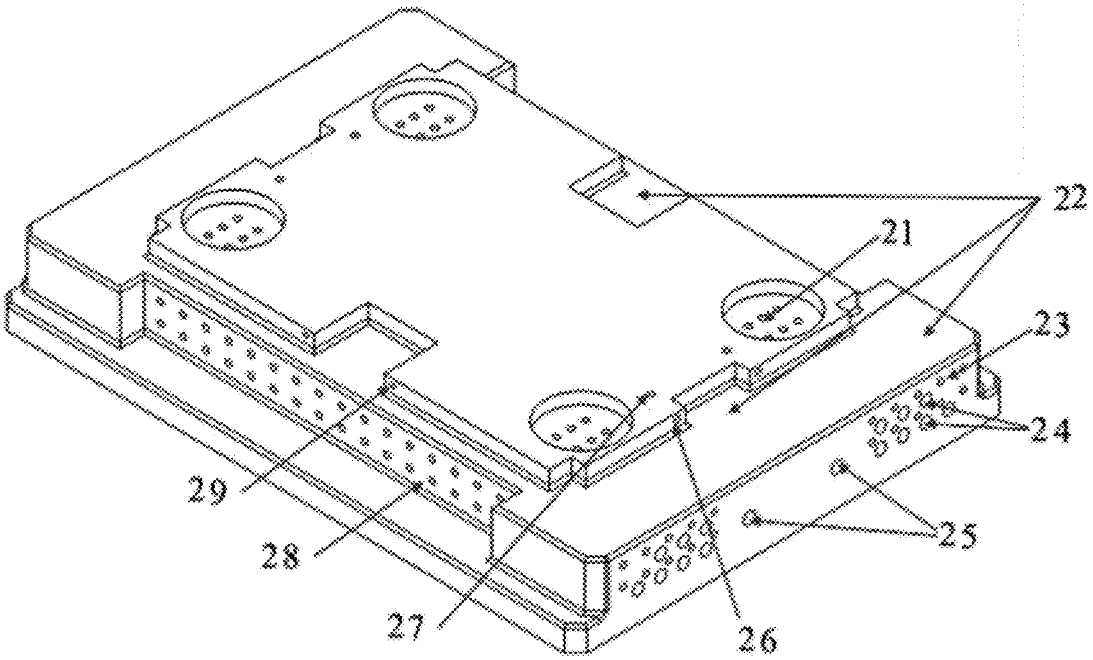
FIG. 2 is a schematic diagram of a marble platform (bottom side up).
Figure 3:
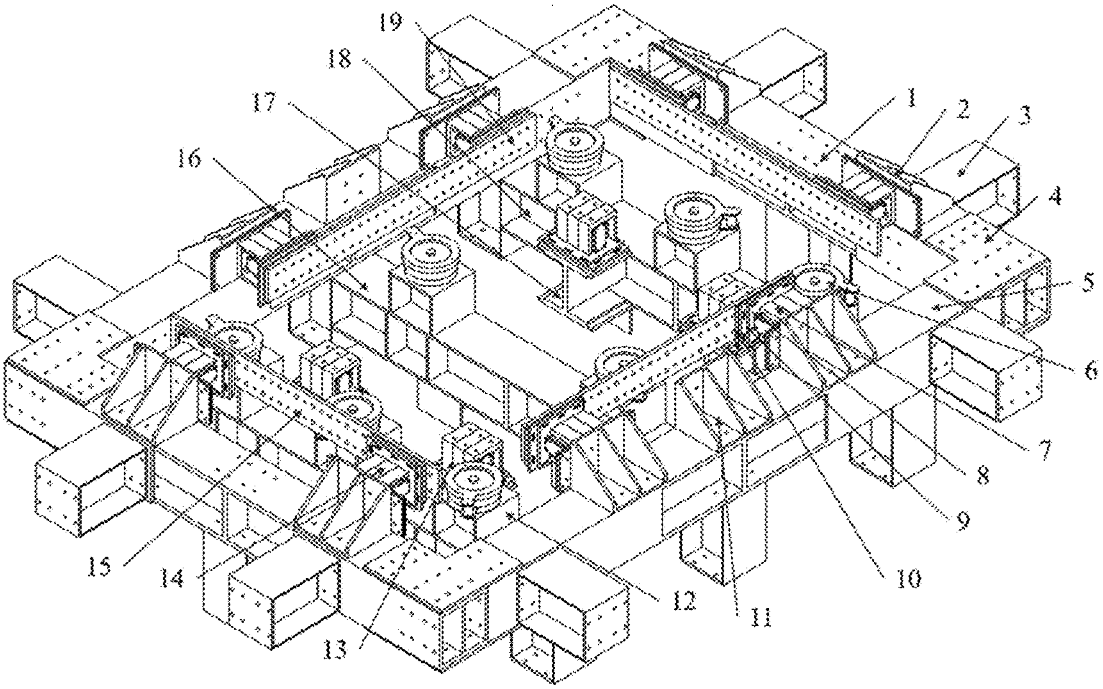
FIG. 3 is a schematic diagram of a marble platform support frame.

With reference to FIGS. 1-3, the present invention provides a six-degree-of-freedom vibrational excitation foundation platform, and the platform includes a marble platform and a marble platform support frame; where the marble platform support frame is an assembly that supports the marble platform and withstands reactive force of a motor, and the motor and air springs are installed on the marble platform support frame; the marble platform support frame is fixedly installed on a concrete floor through a backing plate; the marble platform serves as an excitated device and is located in a middle of the support frame, and four sides of the marble platform support frame are connected to the motor fixedly connected to the support frame through connecting plates, as shown in FIG. 1, it is a schematic diagram of the vibrational excitation foundation platform.

Serving as an excited element, the marble platform features high stiffness, strong pressure resistance, high hardness and uniform characteristics. The marble platform is designed to have a natural frequency higher than 1.414 times the highest value in the vibrational excitation range, thereby ensuring that both frequency and amplitude during vibrational excitation are controllable and not affected by resonance during excitation; the marble platform support frame is an assembly that supports the marble platform and withstands reactive force of the motor, and the motor (an actuator) and the air springs are installed on the marble platform support frame, and when the platform is designed, considerations are given to the stiffness of components, the stability of connections between the components, and first-order natural frequency, thereby ensuring that a support structure will not be subjected to plastic deformation caused by excessive stress or disintegration due to resonance with the vibrational excitation frequency during normal operation of the vibrational excitation foundation platform.

The marble platform is made from uniform marble material with a length, a width and a height of 4 m*3 m*0.6 m, a material density of 3 g/cm$^3$, and a mass of 16.8 t. Under elastic constraint conditions (equivalent to the air spring), seventh-order natural frequency of the marble platform is 159.93 Hz.

The marble platform includes vertical motor connection surfaces 21, on which the following components are mounted: 2*4 M20 mounting threaded hole arrays of the motor; air spring support surfaces 22 being symmetrically distributed in a total of eight areas; short connecting plate mounting surfaces 23, on a single side of which is provided with 2*10 M20 mounting threaded holes array that are symmetrically distributed; 14 lightening holes 24 being symmetrically distributed, each with a dimension of $76 mm*1200 mm; hoisting holes 25 used for flipping and hoisting each with a dimension of $80 mm*150 mm; speed sensor mounting holes 26, 27 and 29 in X\Z\Y directions; and long connecting plate mounting surfaces 28 being symmetrically distributed, on a single side of which is provided with 2*16 M20 mounting threaded hole arrays; and edges of each plane are chamfered to reduce stress concentration, and each edge of the plane is divided into three layers in a vertical direction to reduce local mass while ensuring stiffness, so as to increase natural frequency, and 9*12 M20 mounting threaded hole arrays are symmetrically and evenly distributed on an upper surface of each plane for mounting and fixing the excitated device. FIG. 2 is a schematic diagram of the marble platform (bottom side up).

An overall dimension of the marble platform support frame is 7 m*5.4 m*1.5 m, and is manufactured by processing and splicing 400 mm*400 mm square steel with a wall thickness of 20 mm as basic materials, and a total mass of the support frame is approximately 17 t. Under fixed constraints (at connections with the ground), the first-order natural frequency is 150.45 Hz, and first-order natural frequency of the motor backup plates, a component of the support frame, is 515 Hz under fixed constraints, and Mises stress thereof is 0.3 MPa when a motor output reaches the maximum, thereby ensuring that the support frame will undergo neither resonance nor plastic deformation when the marble platform is vibrating.

The marble platform support frame includes a total of two longitudinal beams 1, on each of which is disposed 2*4 M20 threaded hole arrays everywhere for connecting with other components; a total of 8 motor backup plates 2 in a horizontal direction, on both side and bottom surfaces of which 2*2 M20 threaded holes are formed for connecting the longitudinal beams 1 with triple motors; a total of 22 I-beam legs 3, on both bottom and top surfaces of which 2*4 M20 threaded hole arrays are disposed for connecting with a bottom surface and other components; a total of 8 reinforcement plates 4 being made of 20 mm thick right-angled steel plate and disposed at four corners of the support frame, on each of which is form 20 M20 threaded holes for reinforcing connection between beams 5 of the frame and the longitudinal beams 1, such that the stability of the structure is ensured; a total of two beams 5, on each of which is disposed M20 threaded hole arrays everywhere for connecting with other components; a total of 8 air springs 6 horizontally distributed for bearing weight; the triple motors 7, 13 and 14 in the Y/Z\X directions, the three motors output, and are spliced together and connected in parallel, with M20 mounting threaded holes formed, adjustment plates are mounted in the holes in a motor output direction, and a total of 36 motors in 12 sets are provided; the adjustment plates 8, 9 and 10 for motor mounting for adjusting the mounting posture of the triple motors in the other two directions; limiting devices 11 for ensuring the safety of the marble platform during vibration; air spring brackets 12 for raising the air springs to expand the construction space for maintenance and replacement; short connecting plates 15, on each of which is disposed 2*16 M20 light holes and 2*15 M20 threaded mounting holes for connecting the marble platform and the triple motors; two structurally similar support legs 16 and 18 are welded together for mounting the air springs and the motors in a vertical direction, and a total of 3 support legs are provided; a total of 4 vertical motor backup plates 17 are welded on the legs 18 for mounting the motors 13 in a Z direction; and long connecting plates 19, on each of which is disposed 2*16 M20 light holes and 2*15 M20 threaded mounting holes for connecting the marble platform and the triple motors. FIG. 3 is a schematic diagram of the marble platform support frame.

The above are only preferred embodiments of the present invention, and are not intended to limit the present invention. Although the present invention has been described in detail with reference to the above embodiment, for those skilled in the art, it is still apparent that the technical solutions described in the above embodiment may be modified, or some technical features thereof may be equivalently replaced. Any modifications, equivalent substitutions, improvements, and the like within the spirit and principles of the present invention are intended to be included within the scope of protection of the present invention.

What is claimed is:

1. A six-degree-of-freedom vibrational excitation foundation platform, comprising a marble platform and a marble platform support frame; wherein the marble platform support frame is an assembly that supports the marble platform and withstands reactive force of motors, and the motors and air springs are installed on the marble platform support frame; the marble platform support frame is fixedly installed on a concrete floor through a backing plate; the marble platform serves as an excitated device and is located in a middle of the support frame, and four sides of the marble platform support frame are connected to the motors fixedly connected to the marble platform support frame through connecting plates, wherein the marble platform comprises vertical motor connection surfaces (21), on which the following components are mounted: 2*4 M20 mounting threaded hole arrays of the motor; air spring support surfaces (22) being symmetrically distributed in a total of eight areas; short connecting plate mounting surfaces (23), on a single side of which is provided with 2*10 M20 mounting threaded holes array that are symmetrically distributed; 14 lightening holes (24) being symmetrically distributed, each with a dimension of φ76 mm*1200 mm; hoisting holes (25) used for flipping and hoisting each with a dimension of φ80 mm*150 mm; speed sensor mounting holes (26, 27 and 29) in X\Z\Y directions; and long connecting plate mounting surfaces (28) being symmetrically distributed, on a single side of which is provided with 2*16 M20 mounting threaded hole arrays; and edges of each plane are chamfered to reduce stress concentration, and each edge of the plane is divided into three layers in a vertical direction to reduce local mass while ensuring stiffness, so as to increase natural frequency, and 9*12 M20 mounting threaded hole arrays are symmetrically and evenly distributed on an upper surface of each plane for mounting and fixing the excitated device.

2. The six-degree-of-freedom vibrational excitation foundation platform according to claim 1, wherein the marble platform is made from uniform marble material with a length, a width and a height of 4 m*3 m*0.6 m, a material density of 3 g/cm$^3$, and a mass of 16.8 t, Under elastic constraint conditions, seventh-order natural frequency of the marble platform is 159.93 Hz.

3. The six-degree-of-freedom vibrational excitation foundation platform according to claim 2, wherein the marble platform support frame comprises a total of two longitudinal beams (1), on each of which is disposed 2*4 M20 threaded hole arrays everywhere for connecting with other components; a total of 8 motor backup plates (2) in a horizontal direction, on both side and bottom surfaces of which 2*2 M20 threaded holes are formed for connecting the longitudinal beams (1) with triple motors; a total of 22 I-beam legs (3), on both bottom and top surfaces of which 2*4 M20 threaded hole arrays are disposed for connecting with a bottom surface and other components; a total of 8 reinforcement plates (4) being made of 20 mm thick right-angled steel plate and disposed at four corners of the marble platform support frame, on each of which is form 20 M20 threaded holes for reinforcing connection between beams 5 of the frame and the longitudinal beams (1), such that the stability of the structure is ensured; a total of two beams 5, on each of which is disposed M20 threaded hole arrays everywhere for connecting with other components; a total of 8 air springs (6) horizontally distributed for bearing weight; the triple motors (7, 13 and 14) in the Y/Z/X directions, the three motors output, and are spliced together and connected in parallel, with M20 mounting threaded holes formed, adjustment plates are mounted in the holes in a motor output direction, and a total of 36 motors in 12 sets are provided;

motor mounting and adjustment plates (8, 9 and 10) for adjusting the mounting posture of the triple motors in the other two directions; limiting devices (11) for ensuring the safety of the marble platform during vibration; air spring brackets (12) for raising the air springs to expand the construction space for maintenance and replacement; short connecting plates (15), on each of which is disposed 2*16 M20 light holes and 2*15 M20 threaded mounting holes for connecting the marble platform and the triple motors; two structurally similar support legs (16) and (18) are welded together for mounting the air springs and the motors in a vertical direction, and a total of 3 support legs are provided; a total of 4 vertical motor backup plates (17) are welded on the legs (18) for mounting the motors 13 in a Z direction; and long connecting plates (19), on each of which is disposed 2*16 M20 light holes and 2*15 M20 threaded mounting holes for connecting the marble platform and the triple motors.

4. The six-degree-of-freedom vibrational excitation foundation platform according to claim 3, wherein an overall dimension of the marble platform support frame is 7 m*5.4 m*1.5 m, and is manufactured by processing and splicing 400 mm*400 mm square steel with a wall thickness of 20 mm as basic materials and a total mass of approximately 17 t, Under fixed constraints, first-order natural frequency is 150.45 Hz, and the first-order natural frequency of the motor backup plates, components of the marble platform support frame, is 515 Hz under fixed constraints, and Mises stress thereof is 0.3 MPa when a motor output reaches the maximum, thereby ensuring that the marble platform support frame will undergo neither resonance nor plastic deformation when the marble platform is vibrating.

* * * * *